United States Patent [19]

Nishimura

[11] Patent Number: 4,485,907
[45] Date of Patent: Dec. 4, 1984

[54] THREE STAGE DAMPER DISC WITH INCREASED SUPPORT FOR SIDE PLATES

[75] Inventor: Yoshio Nishimura, Neyagawa, Japan

[73] Assignee: Kabushiki Kaisha Daikin Seisakusho, Osaka, Japan

[21] Appl. No.: 290,530

[22] Filed: Aug. 6, 1981

[30] Foreign Application Priority Data

Sep. 25, 1980 [JP] Japan .................. 55-133812

[51] Int. Cl.³ .................. F16D 3/66; F16D 3/14
[52] U.S. Cl. .................. 192/106.2; 192/70.17; 464/68; 464/64
[58] Field of Search .............. 192/55, 70.17, 70.18, 192/106.1, 106.2; 464/64, 66, 68

[56] References Cited

U.S. PATENT DOCUMENTS

| 2,276,416 | 7/1939 | Nutt | 192/106.2 |
| 3,327,820 | 6/1967 | Maurice | 192/106.2 X |
| 3,578,121 | 5/1971 | Maurice | 192/106.2 |
| 4,254,855 | 3/1981 | Hildebrand et al. | 464/64 |
| 4,269,296 | 5/1981 | Flotow et al. | 464/64 |

FOREIGN PATENT DOCUMENTS

| 725138 | 5/1932 | France | 464/68 |
| 113845 | 6/1980 | Japan . | |

Primary Examiner—Rodney H. Bonck
Assistant Examiner—David D. House
Attorney, Agent, or Firm—Armstrong, Nikaido, Marmelstein & Kubovcik

[57] ABSTRACT

A damper disc applicable to a friction clutch disc, wherein each side plate is arranged between each subplate and a flange of a hub splined on an output shaft, so that a distance between both side plates becomes small, and the side plates can stably support the portions of the torsion springs which are adjacent to the center thereof, in other words, portions adjacent to the flange, and thereby high stability in the twisting operation can be obtained.

9 Claims, 4 Drawing Figures

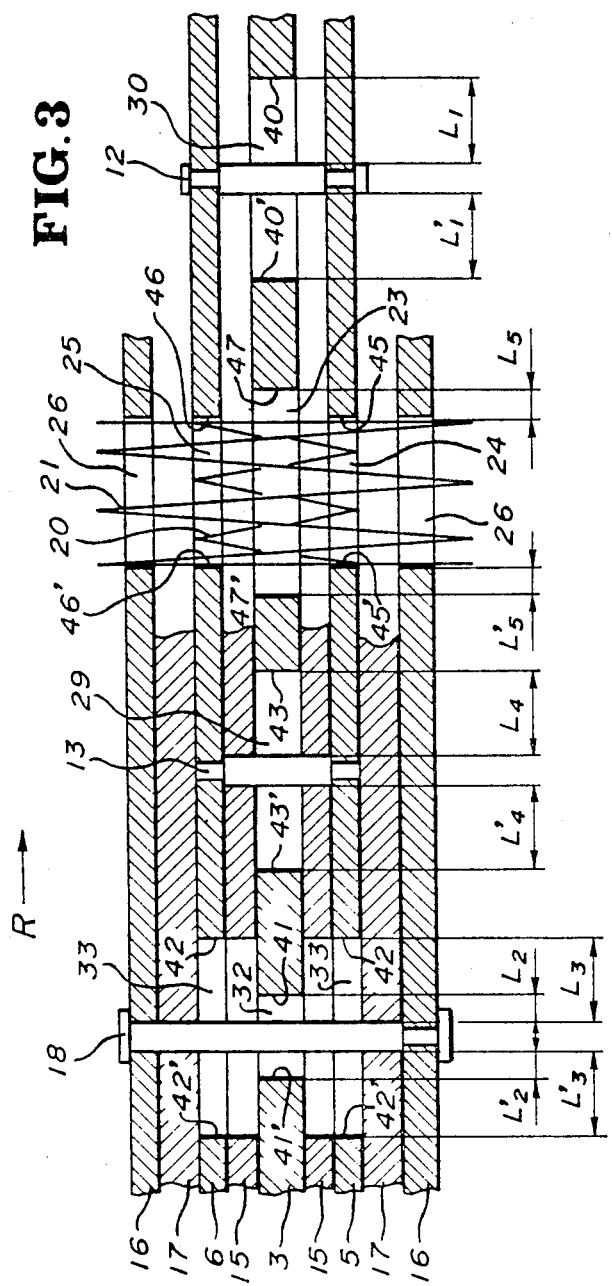

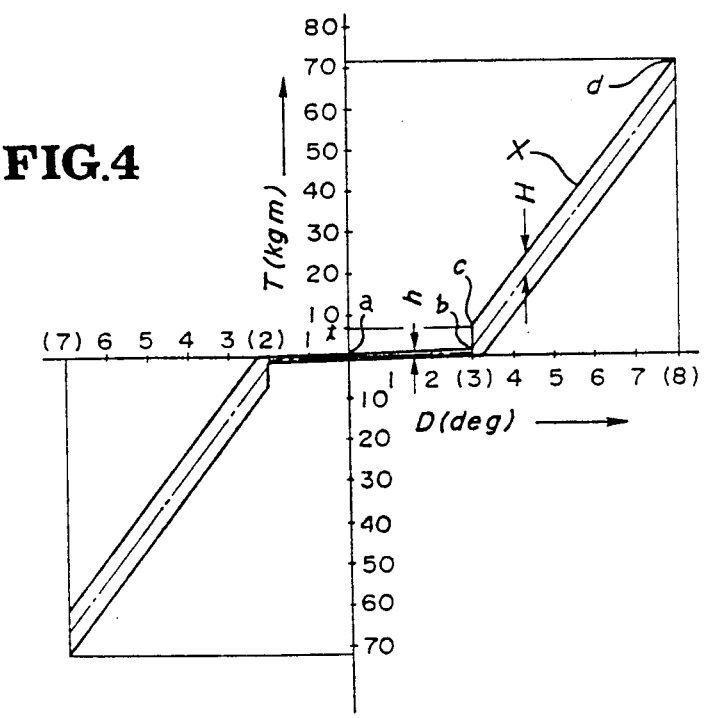

THREE STAGE DAMPER DISC WITH INCREASED SUPPORT FOR SIDE PLATES

BACKGROUND AND SUMMARY OF THE PRESENT INVENTION

This invention relates to a damper disc applicable to friction clutch discs of land vehicles, construction machineries, civil engineering machineries, industrial equipments or the like, and especially suitable for large-sized and medium-sized friction clutch discs.

In a type of known damper discs, a sub-plate is arranged between a radial flange of a hub splined to an output shaft and each of side plates which are a clutch plate and a retaining plate. A first friction member having small frictional force is arranged between the hub-flange and each sub-plate, and a second friction member having large frictional force is arranged between each side plate and each sub-plate. In this construction, when small torque is transmitted, and therefore the relative torsion angle between the hub-flange and the side plates is small, slide occurs on the surface of each first friction member, so that small hysteresis torque occurs. When the transmitted torque increases to large value, and thereby the torsion angle increases to large value, slide occurs on the surface of each second friction member, so that large hysteresis torque occurs. In the disc in which the hysteresis torque changes as stated above, noises can be prevented during both idling and high power driving.

However in this known type of the damper disc, since the sub-plates are arranged between the hub-flange and the side plates, the distance between two side plates is long. Therefore the side plates may not stably support the ends of torsion springs disposed in openings of the sub-plates and the side plates, which may cause dispersion in the characteristics of the twisting operation and may lower the reliability of products.

Further in said disc, since each second friction member is pressed strongly against a surface of each side plate, and other surface of each side plate is not supported by any member, the side plates may be deformed by the pressure into tapered or waved shape. Therefore the desired hysteresis torque may not occur, and the side plates, especially if they are thin, may be destroyed. This disadvantage occurs remarkably in the large-sized and medium-sized discs, in which the second friction members are pressed very strongly so that especially large hysteresis torque may occur.

Accordingly, it is an object of the invention to provide an improved damper disc, wherein each side plate is arranged between each sub-plate and a flange of a hub splined on an output shaft.

Other and futher objects, features and advantages of the invention will appear more fully from the following description of the preferred embodiment of the invention.

BRIEF DESCRIPTION OF THE DRAWINGS

FIG. 3 is a sectional view taken along line III—III in FIG. 2; and

FIG. 4 is a graph explaining the relation between torque and torsion of the clutch disc of the invention.

DETAILED DESCRIPTION OF THE PREFERRED EMBODIMENTS

Figure 1:
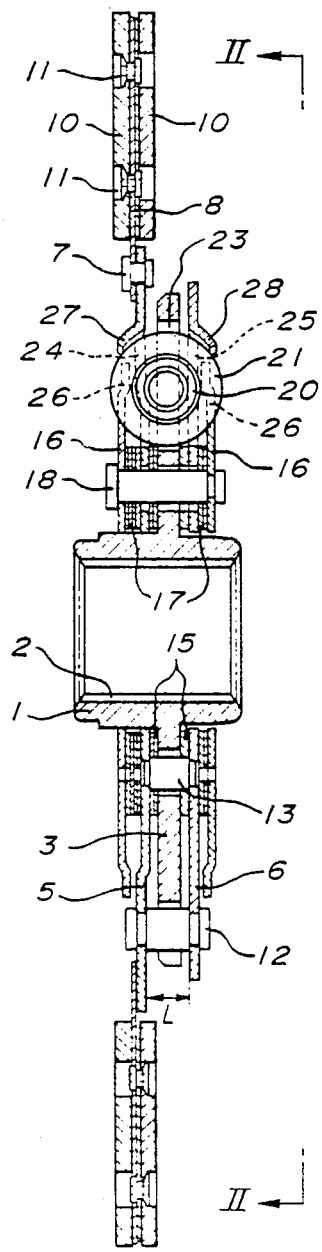
FIG. 1 is a sectional view of a preferred embodiment of the clutch disc of the invention.

Referring to FIG. 1, a hub 1 is provided with inner splines or teeth 2 for coupling to an output shaft (not shown) and is further provided with a radial flange 3 on its outer periphery. A pair of annular side plates 5 and 6 are arranged at both sides of the flange 3. Cushioning plates 8 are fixed at the radially outer portion of the side plate 5, which is a clutch plate, by rivets 7. A pair of annular friction facings 10 are fixed at both faces of the plates 8 by rivets 11, respectively. The outer portions of the side plates 5 and 6 are connected to each other by stop pins 12. Both plates 5 and 6 have apertures at the inner portions, into which both ends having small diameter of a sub-pin 13 are fitted respectively. A first friction member 15, which is a friction washer, a wave spring or the like, is arranged between the radially inner portions of the flange 3 and each of the side plates 5 and 6. Each first friction member 15 has a small frictional force.

Annular sub-plates 16 are arranged along the outside surfaces of the side plates 5 and 6 respectively, so that each of the side plates 5 and 6 is arranged between each sub-plate 16 and the flange 3. A second friction member 17, which is a friction washer, a wave spring or the like, is arranged between the inner portions of each sub-plate 16 and each of the side plates 5 and 6. The inner portions of both sub-plates 16 are tightly connected together by a stud pin 18. The pin 18 pulls the sub-plates 16 strongly toward each other, so that each second friction member 17 may be strongly pressed and may have a large frictional force. As both side plates 5 and 6 are connected together and supported by the sub-pin 13, each first friction member 15 does not receive the pressure which is applied to the plates 5 and 6 by the second friction members 17. Therefore the pressure applied to each first friction member 15 is small, and the frictional force of each member 15 is small as stated before. The surfaces of each first friction member 15 may be formed smooth, and the surfaces of each second member 17 may be formed rough, for setting the difference of the frictional forces as stated above.

Torsion springs 20 and 21 (compressible coil springs) respectively having a small diameter and a large diameter are arranged coaxially. The springs 20 and 21 extend in a substantially circumferential direction of the disc (in other words, vertically with respect to FIG. 1), and are arranged in openings 24, 25 and 23 formed in the side plates 5 and 6 and the flange 3 and registering in axial direction of the disc (in other words, transversely with respect to FIG. 1). Side portions of each spring 21 protruding beyond the openings 24 and 25 are engaged into openings or notches 26 formed at radially outer portion of the sub-plates 16. The side plates 5 and 6 are provided with visor-like bent portions 27 and 28 formed along outer peripheral edges of the openings 24 and 25, respectively. Each of the bent portions 27 and 28 extends adjacently along or contacts with the radially outer portion of said protruding portion of the spring 21, and thereby each spring 21 is prevented from disengaging from the openings 23, 24 and 25. The inner peripheral edge of each notch 26 is cut slantingly along the periphery of each spring 21, and extends adjacently along or contacts with the side portion of the spring 21.

Thus the spring 21 is also prevented from disengaging from the openings 23, 24 and 25.

Figure 2:
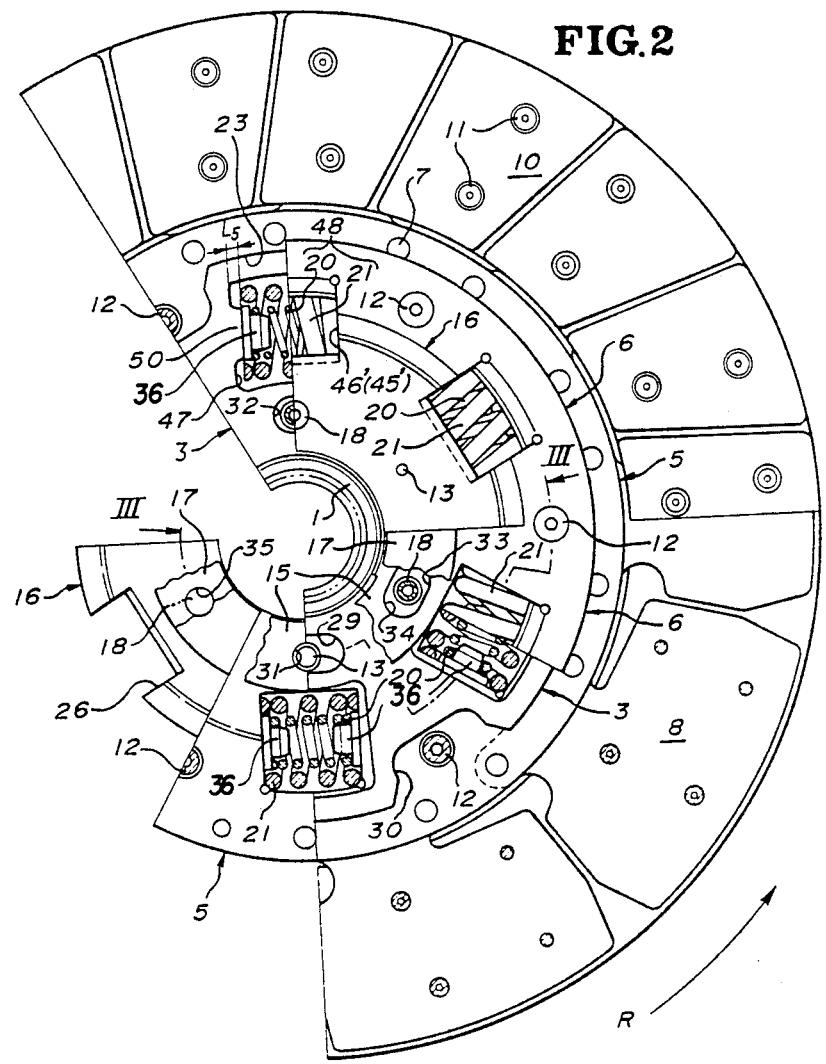
FIG. 2 partial view of the clutch disc viewed in the direction of arrows II—II in FIG. 1 with certain part cut out.

Referring to FIG. 2, six pairs of the springs 20 and 21 are disposed in the disc, and are equally spaced to each other in the circumferential direction of the disc. Spring seats 36 are arranged at both ends of each small spring 20. Six stop pins 12 are circumferentially and equally spaced to each other, and extend through openings or notches 30 formed in the flange 3, respectively. The disc has three sub-pins 13 and three stud pins 18 arranged one after the other and equally spaced to each other. Each sub pin 13 extends through a circumferentially long aperture 29 formed in the flange 3, and is fitted into an aperture 31 formed in the first friction members 15. Circumferentially long apertures 32, 33 and 34, through which each stud pin 18 extends, are formed in the flange 3, the side plates 5 and 6 and the first friction members 15. The apertures 33 and 34 have same form and size. Each pin 18 is fitted into an aperture 35 of the second friction member 17.

Referring to FIG. 3, circumferential spaces $L_1$ and $L'_1$ are formed between each stop pin 12 and both side edges 40 and 40' of each notch 30 of the flange 3. The space $L_1$ and $L'_1$ and other spaces detailed hereinafter are formed when the plates 5, 6 and 16 do not twist or torsionally turn with respect to the flange 3 as illustrated in FIG. 3 and torsion angle D (see FIG. 4) is 0°. The space $L_1$ corresponds to maximum torsion angle, e.g., 8° in FIG. 4, in the positive torsion direction. The space $L'_1$ corresponds to maximum torsion angle, e.g., 7°, in negative torsion direction. spaces $L_2$ and $L'_2$ are formed between each stud pin 18 and both side edges 41 and 41' of each aperture 32 of the flange 3. The spaces $L_2$ and $L'_2$ correspond to first positive torsion angle 3° and first negative torsion angle 2°, respectively. Spaces $L_3$ and $L'_3$ are formed between each stud pin 18 and both side edges 42 42' of each aperture 33 of the side plates 5 and 6. The spaces $L_3$ and $L'_3$ correspond to positive and negative second torsion angle 5°, which is the difference between the maximum angle 8° and 7° and the first angle 3° and 2° (8°-3°, 7°-2°), respectively. Spaces $L_4$ and $L'_4$ are formed between the sub-pin 13 and the side edges 43 and 43' of each aperture 29 of the flange 3. The spaces $L_4$ and $L'_4$ correspond to torsion angles which are the same as or larger than said maximum torsion angles, respectively.

When the torsion angle D is 0°, both ends of the springs 20 and 21 contact with side edges 45, 45', 46 and 46' of the openings 24 and 25 of the side plates 5 and 6. Five pairs of the six springs pairs (20 and 21 in FIG. 2), that is excepting spring pair 48, have the same construction as follows. Both ends of said five spring pairs are distant from both side edges 47 and 47' of the opening 23 of the flange 3 with spaces $L_5$ and $L'_5$ respectively therebetween, which correspond to the first torsion angles 3° and 2°. The one odd spring pair 48 is disposed in the opening 23, which has a projection 50 at each side edge 47 for supporting the spring seat 36 of the small spring 20. Portions of the side edge 47 except the projection 50 are distant from the large spring 20 with spaces therebetween which are the same as the spaces $L_5$ and $L'_5$ in FIG. 4.

The operation is as follows. In the situation, as illustrated in FIGS. 1 to 3, where the torsion angle D is 0°, when the facings 10 are pressed to a flywheel (not shown) of an engine by a pressure plate (not shown), torque is transmitted to the side plates 5 and 6, and the disc rotates in a direction R in FIG. 2. While the torque is a low valve, the side plates 5 and 6 are connected to the flange 3 by means of the first friction members 15 without any slide, and the torque T is transmitted from the plates 5 and 6 to the output shaft through the first friction members 15, the flange 3 and the hub 1.

When the torque T exceeds said low value corresponding to the maximum frictional force of the friction members 15, slide occurs between the members 15 and the flange 3, thereby the side plate 5 and 6 twist with respect to the flange 3 in the rotating direction R of the disc in FIG. 2. By this twist, the small spring 20 of the springs pair 48 is pressed by the projections 50 and the side edges 45', 46' of the openings 24 and 25. Thus, the torque is transmitted from the plates 5 and 6 to the flange 3 through one small spring 20. During this operation, the sub-plates 16 are moved together with the side plates 5 and 6 by the frictional force of the members 17 without any slide. Since only one weak spring 20 operates as a spring for transmitting the torque in this operation, the rate of increase of the torque T with respect to the torsion angle D of the plates 5 and 6 is low as shown in section a - b of torque-angle characteristic line X in FIG. 4. Further, a small hysteresis torque h caused by said slide of the members 15 occurs in this operation as illustrated in FIG. 4.

When the torsion angle D reaches 3°, the subplates 16 moved with the side plates 5 and 6 occupy the position where each stud pin 18 moved. The space $L_2$ is in contact with the side edge 41 of the opening of the flange 3. After this contact, the sub-plates 16 move together with the flange 3, and the torque is transmitted from the side plates 5 and 6 to the flange 3 through the second friction members 17, sub-plates 16 and the stud pins 18. While the torque T is lower than or same as a predetermined value t, any slide does not occur on the members 17, and the angle D remains at 3°. Further, when the angle D reaches 3, other five small springs 20 and six large springs 21 held by the side plates 5 and 6 contact with the side edges 47 of the openings 23 of the flange 3, after they travelled the space $L_5$.

When the torque T exceeds the value t, slide occurs on the surfaces of the members 17, and the side plates 5 and 6 twist with respect to the flange 3 and the sub-plates. Thus all of the springs 20 and 21 are compressed by the side edges 47 of the openings 23 of the flange 3 and the side edges 45' and 46' of the openings 24 and 25 of the plates 5 and 6, and the torque is transmitted from the plates 5 and 6 to the flange 3 through all of the springs 20 and 21. In this operation, large hysteresis torque H is produced by the slide of the members 17 as shown in section c-d of the line X in FIG. 4. Further, in this operation, since all of the springs 20 and 21 are compressed, the rate of increase of the torque T with respect to the torsion angle D is high, and the incline of the line X increases in section c-d.

When the torsion angle D reaches 8°, each stop pin 12 contacts with the side edge 40 of each notch 30, and further torsion is prevented.

When the torque T decreases to 0 kgm from the maximum value, the torsion angle D decreases to 0°. During this decreasing operation, the incline of the line X changes once, and the hysteresis torque changes once. When the torque T increases in negative direction from 0 kgm, each member operates similarly as above, the angle D increases to 7° in negative area, and the hysteresis torque and the incline of the line X change at the angle 2°.

According to the invention, as detailed hereinbefore, as the hysteresis torque changes, the noise during idling and high power driving of the engine can effectively be prevented. Further, as the sub-plates 16 are arranged along the outsides of the side plates 5 and 6, a distance L (see FIG. 1) between both side plates 5 and 6 becomes small. Therefore the side plates 5 and 6 can stably support the portions of the springs 20 and 21 which are adjacent to the center thereof, in other words, portions adjacent to the flange 3, so that high stability in the twisting operation can be obtained. Although the members 17 press the surfaces of the side plates 5 and 6 facing to the adjacent sub-plates 16, the three pins 13 and the member 15 support the side plates 5 and 6 against said pressure by the members 17. Therefore, the side plates 5 and 6 are prevented from being deformed into tapered shape or waved shape by said pressure, and each member operates stably. As stated above, since the second friction members 17 can be pressed strongly, the second hysteresis torque H can be set large. Therefore, the invention is suitable for the damper disc of large and medium size for transmitting large torque.

If, as the known construction, the side plates 5 and 6 are arranged along the outsides of the sub-plates 16, which is not the invention, bent portions similar to the portions 27 and 28 should be formed along the inner peripheral edges of the openings 24 and 25 for preventing the disengage of the spring 20 and 21. However, in the illustrated embodiment, since the sub-plates 16 hold the radially inner portions, in other words, portions adjacent to the hub 1, of the springs 21, it is not necessary to form bent portions along the inner peripheral edges of the openings 24 and 25, which simplifies the structure.

The length of the spaces $L_2$ and $L'_2$ and the spaces $L_5$ and $L'_5$ may be set relatively different from each other with respect to the torsion angle, so that the hysteresis torque and the incline of the line X may change at different torsion angles. One spring may be employed instead of a pair of the springs 20 and 21. Such spring mechanism may be employed that the incline of the line X changes twice.

Although the invention has been described in its preferred form with a certain degree of particularity, it is understood that the stucture of the preferred form may be changed in the details of construction, and that the combination and arrangement of parts may be modified to without departing from the spirit and scope of the invention as hereinafter claimed.

What is claimed:

1. In a damper disc including a hub having a radial flange, a pair of annular side plates disposed on respective sides of the flange, and respective pairs of springs disposed in openings formed in the flange and side plates and connected therebetween, the improvement which comprises a pair of sub-plates, each of which is disposed axially outwardly of a respective side plate, means for connecting the radially inner portions of the sub-plates together, first frictional members between the flange and side plates, respectively, and having a relatiely small frictional force, and second frictional members between the side plates and sub-plates, respectively, and having a relatively large frictional force, whereby the distance between the side plates is minimized, whereby the springs are stably supported, and whereby the respectve side plates are supported on both sides to prevent deformation or breakage thereof.

2. The improvement of claim 1, wherein the means for connecting the radially inner portions of the sub-plates together comprises at least one stud pin extending through the respective frictional members.

3. The improvement of claim 2, wherein the flange has a first opening formed therein through which the stud pin extends, whereby the space between the stud pin and a side edge of the first opening corresponds to a first torsion angle, and wherein the respective side plates have second openings formed therein through which the stud pin extends, whereby the space between the stud pin and side edges of the second openings correspond to a second torsion angle.

4. The improvement of claim 3, further including at least one stop pin connecting the radially outer portions of the respective side plates together, and the flange having a third opening formed therein through which the stop pin extends, whereby the space between the stop pin and a side edge of the third opening corresponds to the maximum torsion angle.

5. The improvement of claim 1, wherein the springs are respective torsion springs arranged coaxialy of one another, and wherein a plurality of said torsion springs are disposed in a corresponding plurality of openings between the flange and side plates, respectively.

6. The improvement of claim 5, wherein one of the torsion springs is relatively small, and wherein a projection is provided at the side edge of the opening in the flange to support said relatively-small torsion spring.

7. The improvement of claim 1, wherein the first friction members are fixed to the respective side plates by sub-pins.

8. The improvement of claim 1, wherein a plurality of stud pins are provided, and wherein the second friction members are fixed to the respective sub-plates by the stud pins.

9. The damper disc of claim 1, wherein some of the springs are distant from the side edges of the openings in the flange with spaces corresponding to a torsion angle which is less than the maximum torsion angle, when the side-plate is not twisted.

* * * * *